US011488257B2

(12) United States Patent
Pecoraro et al.

(10) Patent No.: US 11,488,257 B2
(45) Date of Patent: Nov. 1, 2022

(54) APPLYING RETROACTIVE ADJUSTMENTS TO FINANCIAL ACCOUNTS

(71) Applicant: Teachers Insurance and Annuity Association of America, New York, NY (US)

(72) Inventors: Alexis Salvatore Pecoraro, Huntersville, NC (US); Matthew George Nettleton, Ithaca, NY (US); Gregory Bernard Bahns, West Chester, OH (US); Steven Scott Winchester, Cincinnati, OH (US); James Douglas Ecker, West Chester, OH (US); John Bruce Englert, Gilbert, AZ (US)

(73) Assignee: TEACHERS INSURANCE AND ANNUITY ASSOCIATION OF AMERICA, New York, NY (US)

( * ) Notice: Subject to any disclaimer, the term of this patent is extended or adjusted under 35 U.S.C. 154(b) by 115 days.

(21) Appl. No.: 15/815,135

(22) Filed: Nov. 16, 2017

(65) Prior Publication Data

US 2019/0147544 A1 May 16, 2019

(51) Int. Cl.
*G06Q 40/00* (2012.01)
*G06F 11/14* (2006.01)

(52) U.S. Cl.
CPC ......... *G06Q 40/12* (2013.12); *G06F 11/1448* (2013.01); *G06F 2201/84* (2013.01)

(58) Field of Classification Search
CPC .. G06Q 40/12; G06Q 20/204; G06Q 20/3278; G06Q 20/322; G06Q 20/4037; G06F 2201/84; G06F 11/1448; G06F 11/1474
See application file for complete search history.

(56) References Cited

U.S. PATENT DOCUMENTS

| 6,611,811 | B1 * | 8/2003 | Deaton | G06Q 20/20 |
| | | | | 705/14.38 |
| 8,082,196 | B2 * | 12/2011 | Mullan | G06Q 40/12 |
| | | | | 705/35 |
| 8,498,938 | B1 * | 7/2013 | Bierschwale | G06Q 40/02 |
| | | | | 705/1.1 |

(Continued)

FOREIGN PATENT DOCUMENTS

WO  WO-2012037636 A1 * 3/2012 ......... H04L 12/1895

*Primary Examiner* — Peter Ludwig
*Assistant Examiner* — Avia Salman
(74) *Attorney, Agent, or Firm* — Lowenstein Sandler LLP

(57) ABSTRACT

Methods and systems of applying retroactive adjustments to financial data. An example method includes: receiving one or more adjustment records associated with a financial account; saving a snapshot of the financial account, the snapshot comprising a plurality of transaction records reflecting previously processed transactions associated with the financial account; merging the adjustment records and the transaction records to produce a plurality of adjusted transaction records; processing adjusted transaction records to produce an updated state of the financial account; comparing the saved snapshot to the updated state of the financial account to produce one or more adjustment events; and processing the adjustment events using one or more event processing rules.

18 Claims, 9 Drawing Sheets

(56) References Cited

U.S. PATENT DOCUMENTS

| | | | |
|---|---|---|---|
| 2002/0111891 A1* | 8/2002 | Hoffman | G06Q 40/02 705/36 R |
| 2003/0158798 A1* | 8/2003 | Green | G06Q 40/02 705/30 |
| 2015/0262181 A1* | 9/2015 | Gervais | G06Q 20/10 705/44 |

* cited by examiner

Set of Adjustment Records

| 210 Date Received | 220 Effective Date | 230 Compensation Received | 240 Employee Contribution |
|---|---|---|---|
| 11/27/2017 | 03/17/2017 | $49,900.00 | $4,990.00 |
| 11/27/2017 | 04/28/2017 | | ($540.00) |
| 11/27/2017 | 05/12/2017 | | ($1,550.00) |
| 11/27/2017 | 05/26/2017 | | ($1,550.00) |
| 11/27/2017 | 06/09/2017 | | ($1,350.00) |

Account snapshot

| 310 Date Received | 320 Effective Date | 330 Compensation Received | 340 Compensation Limited | 350 Limited Employee Contribution | 360 Match Calculated |
|---|---|---|---|---|---|
| 01/09/2017 | 01/06/2017 | $15,000.00 | $15,000.00 | $1,500.00 | $900.00 |
| 01/23/2017 | 01/20/2017 | $15,000.00 | $15,000.00 | $1,500.00 | $900.00 |
| 02/06/2017 | 02/03/2017 | $15,000.00 | $15,000.00 | $1,500.00 | $900.00 |
| 02/20/2017 | 02/17/2017 | $15,000.00 | $15,000.00 | $1,500.00 | $900.00 |
| 03/06/2017 | 03/03/2017 | $15,000.00 | $15,000.00 | $1,500.00 | $900.00 |
| 03/20/2017 | 03/17/2017 | $15,000.00 | $15,000.00 | $1,500.00 | $900.00 |
| 04/03/2017 | 03/31/2017 | $15,000.00 | $15,000.00 | $1,500.00 | $900.00 |
| 04/17/2017 | 04/14/2017 | $15,000.00 | $15,000.00 | $1,500.00 | $900.00 |
| 05/01/2017 | 04/28/2017 | $15,500.00 | $15,500.00 | $1,550.00 | $930.00 |
| 05/15/2017 | 05/12/2017 | $15,500.00 | $15,500.00 | $1,550.00 | $930.00 |
| 05/29/2017 | 05/26/2017 | $15,500.00 | $15,500.00 | $1,550.00 | $930.00 |
| 06/12/2017 | 06/09/2017 | $15,500.00 | $15,500.00 | $1,350.00 | $930.00 |
| 06/26/2017 | 06/23/2017 | $15,500.00 | $15,500.00 | $0.00 | $930.00 |
| 07/10/2017 | 07/07/2017 | $15,500.00 | $15,500.00 | $0.00 | $930.00 |
| 07/24/2017 | 07/21/2017 | $15,500.00 | $15,500.00 | $0.00 | $930.00 |
| 08/07/2017 | 08/04/2017 | $15,500.00 | $15,500.00 | $0.00 | $930.00 |
| 08/21/2017 | 08/18/2017 | $15,500.00 | $15,500.00 | $0.00 | $930.00 |
| 09/04/2017 | 09/01/2017 | $15,500.00 | $10,500.00 | $0.00 | $630.00 |
| 09/18/2017 | 09/15/2017 | $15,500.00 | $0.00 | $0.00 | $0.00 |
| 10/02/2017 | 09/29/2017 | $15,500.00 | $0.00 | $0.00 | $0.00 |
| 10/16/2017 | 10/13/2017 | $15,500.00 | $0.00 | $0.00 | $0.00 |
| 10/30/2017 | 10/27/2017 | $15,500.00 | $0.00 | $0.00 | $0.00 |
| 11/13/2017 | 11/10/2017 | $15,500.00 | $0.00 | $0.00 | $0.00 |
| 11/27/2017 | 11/24/2017 | $15,500.00 | $0.00 | $0.00 | $0.00 |

Previously Processed Transaction Records 520

| Date Received | Effective Date | Compensation Received | Limited Employee Contribution |
|---|---|---|---|
| 01/09/2017 | 01/06/2017 | $15,000.00 | $1,500.00 |
| 01/23/2017 | 01/20/2017 | $15,000.00 | $1,500.00 |
| 02/06/2017 | 02/03/2017 | $15,000.00 | $1,500.00 |
| 02/20/2017 | 02/17/2017 | $15,000.00 | $1,500.00 |
| 03/06/2017 | 03/03/2017 | $15,000.00 | $1,500.00 |
| 03/20/2017 | 03/17/2017 | $15,000.00 | $1,500.00 |
| 04/03/2017 | 03/31/2017 | $15,000.00 | $1,500.00 |
| 04/17/2017 | 04/14/2017 | $15,500.00 | $1,550.00 |
| 05/01/2017 | 04/28/2017 | $15,500.00 | $1,550.00 |
| 05/15/2017 | 05/12/2017 | $15,500.00 | $1,550.00 |
| 05/29/2017 | 05/26/2017 | $15,500.00 | $1,550.00 |
| 06/12/2017 | 06/09/2017 | $15,500.00 | $1,350.00 |
| 06/26/2017 | 06/23/2017 | $15,500.00 | |
| 07/10/2017 | 07/07/2017 | $15,500.00 | |
| 07/24/2017 | 07/21/2017 | $15,500.00 | |
| 08/07/2017 | 08/04/2017 | $15,500.00 | |
| 08/21/2017 | 08/18/2017 | $15,500.00 | |
| 09/04/2017 | 09/01/2017 | $15,500.00 | |
| 09/18/2017 | 09/15/2017 | $15,500.00 | |
| 10/02/2017 | 09/29/2017 | $15,500.00 | |
| 10/16/2017 | 10/13/2017 | $15,500.00 | |
| 10/30/2017 | 10/27/2017 | $15,500.00 | |
| 11/13/2017 | 11/10/2017 | $15,500.00 | |
| 11/27/2017 | 11/24/2017 | $15,500.00 | |

Set of Adjustment Records 510

| Date Received | Effective Date | Compensation Received | Employee Contribution |
|---|---|---|---|
| 11/27/2017 | 03/17/2017 | $49,900.00 | $4,990.00 |
| 11/27/2017 | 04/28/2017 | | ($540.00) |
| 11/27/2017 | 05/12/2017 | | ($1,550.00) |
| 11/27/2017 | 05/26/2017 | | ($1,550.00) |
| 11/27/2017 | 06/09/2017 | | ($1,350.00) |

Set of Adjusted Transactions 530

| Date Received | Effective Date | Compensation Received | Employee Contribution |
|---|---|---|---|
| 11/27/2017 | 03/17/2017 | $64,900.00 | $6,490.00 |
| 11/27/2017 | 04/28/2017 | | $1,010.00 |
| 11/27/2017 | 05/12/2017 | | $0.00 |
| 11/27/2017 | 05/26/2017 | | $0.00 |
| 11/27/2017 | 06/09/2017 | | $0.00 |

Adjusted Account Data 610

| Date Received | Effective Date | Compensation Received | Compensation Limited* | Limited Employee Contribution | Match Calculated |
|---|---|---|---|---|---|
| 01/09/2017 | 01/06/2017 | $15,000.00 | $15,000.00 | $1,500.00 | $900.00 |
| 01/23/2017 | 01/20/2017 | $15,000.00 | $15,000.00 | $1,500.00 | $900.00 |
| 02/06/2017 | 02/03/2017 | $15,000.00 | $15,000.00 | $1,500.00 | $900.00 |
| 02/20/2017 | 02/17/2017 | $15,000.00 | $15,000.00 | $1,500.00 | $900.00 |
| 03/06/2017 | 03/03/2017 | $15,000.00 | $15,000.00 | $1,500.00 | $900.00 |
| 11/27/2017 | 03/17/2017 | $64,900.00 | $64,900.00 | $6,490.00 | $3,894.00 |
| 04/03/2017 | 03/31/2017 | $15,000.00 | $15,000.00 | $1,500.00 | $900.00 |
| 04/17/2017 | 04/14/2017 | $15,000.00 | $15,000.00 | $1,500.00 | $900.00 |
| 05/01/2017 | 04/28/2017 | $15,500.00 | $15,500.00 | $1,010.00 | $930.00 |
| 05/15/2017 | 05/12/2017 | $15,500.00 | $15,500.00 | $0.00 | $930.00 |
| 05/29/2017 | 05/26/2017 | $15,500.00 | $15,500.00 | $0.00 | $930.00 |
| 06/12/2017 | 06/09/2017 | $15,500.00 | $15,500.00 | $0.00 | $930.00 |
| 06/26/2017 | 06/23/2017 | $15,500.00 | $15,500.00 | $0.00 | $930.00 |
| 07/10/2017 | 07/07/2017 | $15,500.00 | $15,500.00 | $0.00 | $426.00 |
| 07/24/2017 | 07/21/2017 | $15,500.00 | $7,100.00 | $0.00 | $0.00 |
| 08/07/2017 | 08/04/2017 | $15,500.00 | $0.00 | $0.00 | $0.00 |
| 08/21/2017 | 08/18/2017 | $15,500.00 | $0.00 | $0.00 | $0.00 |
| 09/04/2017 | 09/01/2017 | $15,500.00 | $0.00 | $0.00 | $0.00 |
| 09/18/2017 | 09/15/2017 | $15,500.00 | $0.00 | $0.00 | $0.00 |
| 10/02/2017 | 09/29/2017 | $15,500.00 | $0.00 | $0.00 | $0.00 |
| 10/16/2017 | 10/13/2017 | $15,500.00 | $0.00 | $0.00 | $0.00 |
| 10/30/2017 | 10/27/2017 | $15,500.00 | $0.00 | $0.00 | $0.00 |
| 11/13/2017 | 11/10/2017 | $15,500.00 | $0.00 | $0.00 | $0.00 |
| 11/27/2017 | 11/24/2017 | $15,500.00 | $0.00 | $0.00 | $0.00 |

Account Snapshot 300

| Date Received | Effective Date | Compensation Received | Compensation Limited* | Limited Employee Contribution | Match Calculated |
|---|---|---|---|---|---|
| 01/09/2017 | 01/06/2017 | $15,000.00 | $15,000.00 | $1,500.00 | $900.00 |
| 01/23/2017 | 01/20/2017 | $15,000.00 | $15,000.00 | $1,500.00 | $900.00 |
| 02/06/2017 | 02/03/2017 | $15,000.00 | $15,000.00 | $1,500.00 | $900.00 |
| 02/20/2017 | 02/17/2017 | $15,000.00 | $15,000.00 | $1,500.00 | $900.00 |
| 03/06/2017 | 03/03/2017 | $15,000.00 | $15,000.00 | $1,500.00 | $900.00 |
| 03/20/2017 | 03/17/2017 | $15,000.00 | $15,000.00 | $1,500.00 | $900.00 |
| 04/03/2017 | 03/31/2017 | $15,000.00 | $15,000.00 | $1,500.00 | $900.00 |
| 04/17/2017 | 04/14/2017 | $15,000.00 | $15,000.00 | $1,500.00 | $900.00 |
| 05/01/2017 | 04/28/2017 | $15,500.00 | $15,500.00 | $1,550.00 | $930.00 |
| 05/15/2017 | 05/12/2017 | $15,500.00 | $15,500.00 | $1,550.00 | $930.00 |
| 05/29/2017 | 05/26/2017 | $15,500.00 | $15,500.00 | $1,550.00 | $930.00 |
| 06/12/2017 | 06/09/2017 | $15,500.00 | $15,500.00 | $1,550.00 | $930.00 |
| 06/26/2017 | 06/23/2017 | $15,500.00 | $15,500.00 | $1,550.00 | $930.00 |
| 07/10/2017 | 07/07/2017 | $15,500.00 | $15,500.00 | $0.00 | $930.00 |
| 07/24/2017 | 07/21/2017 | $15,500.00 | $15,500.00 | $0.00 | $930.00 |
| 08/07/2017 | 08/04/2017 | $15,500.00 | $15,500.00 | $0.00 | $930.00 |
| 08/21/2017 | 08/18/2017 | $15,500.00 | $10,500.00 | $0.00 | $630.00 |
| 09/04/2017 | 09/01/2017 | $15,500.00 | $0.00 | $0.00 | $0.00 |
| 09/18/2017 | 09/15/2017 | $15,500.00 | $0.00 | $0.00 | $0.00 |
| 10/02/2017 | 09/29/2017 | $15,500.00 | $0.00 | $0.00 | $0.00 |
| 10/16/2017 | 10/13/2017 | $15,500.00 | $0.00 | $0.00 | $0.00 |
| 10/30/2017 | 10/27/2017 | $15,500.00 | $0.00 | $0.00 | $0.00 |
| 11/13/2017 | 11/10/2017 | $15,500.00 | $0.00 | $0.00 | $0.00 |
| 11/27/2017 | 11/24/2017 | $15,500.00 | $0.00 | $0.00 | $0.00 |

FIG. 6

Adjustment Summary Table 710

| Effective Date 720 | Delta Limited Employee Contribution | Delta Match Calculated 740 | Employee Contribution 750 | Match 760 |
|---|---|---|---|---|
| 01/06/2017 | $0.00 | $0.00 | | |
| 01/20/2017 | $0.00 | $0.00 | | |
| 02/03/2017 | $0.00 | $0.00 | | |
| 02/17/2017 | $0.00 | $0.00 | | |
| 03/03/2017 | $0.00 | $0.00 | | |
| 03/17/2017 | $4,990.00 | $2,994.00 | $6,490.00 | $3,894.00 |
| 03/31/2017 | $0.00 | $0.00 | | |
| 04/14/2017 | ($540.00) | $0.00 | | |
| 04/28/2017 | $0.00 | $0.00 | $1,010.00 | |
| 05/12/2017 | ($1,550.00) | $0.00 | $0.00 | |
| 05/26/2017 | ($1,550.00) | $0.00 | $0.00 | |
| 06/09/2017 | ($1,350.00) | $0.00 | | |
| 06/23/2017 | $0.00 | $0.00 | | |
| 07/07/2017 | $0.00 | $0.00 | | |
| 07/21/2017 | $0.00 | ($504.00) | | $426.00 |
| 08/04/2017 | $0.00 | ($930.00) | | $0.00 |
| 08/18/2017 | $0.00 | ($930.00) | | $0.00 |
| 09/01/2017 | $0.00 | ($630.00) | | $0.00 |
| 09/15/2017 | $0.00 | $0.00 | | |
| 09/29/2017 | $0.00 | $0.00 | | |
| 10/13/2017 | $0.00 | $0.00 | | |
| 10/27/2017 | $0.00 | $0.00 | | |
| 11/10/2017 | $0.00 | $0.00 | | |
| 11/24/2017 | $0.00 | $0.00 | | |

730

Event Set 770

| Effective Date 780 | Event 790 | Adjusted Transaction Amt. 795 |
|---|---|---|
| 03/17/2017 | Employee Contribution Change | $6,490.00 |
| 03/17/2017 | Match Contribution Change | $3,894.00 |
| 04/28/2017 | Employee Contribution Change | $1,010.00 |
| 05/12/2017 | Employee Contribution Change | $0.00 |
| 05/26/2017 | Employee Contribution Change | $0.00 |
| 06/09/2017 | Employee Contribution Change | $0.00 |
| 07/21/2017 | Match Contribution Change | $426.00 |
| 08/04/2017 | Match Contribution Change | $0.00 |
| 08/18/2017 | Match Contribution Change | $0.00 |
| 09/01/2017 | Match Contribution Change | $0.00 |

FIG. 7

APPLYING RETROACTIVE ADJUSTMENTS TO FINANCIAL ACCOUNTS

TECHNICAL FIELD

The present disclosure is generally related to distributed computer systems, and is more specifically related to methods and systems of applying retroactive adjustments to financial accounts.

BACKGROUND

Financial accounts may be held by financial institutions on behalf of respective account holders. Examples of financial institutions include, but are not limited to, banks, building societies, credit unions, trust companies, mortgage loan companies, insurance companies, pension funds, investment banks, underwriters, brokerage firms, etc. Examples of financial accounts include, but are not limited to, checking accounts, savings accounts, loan accounts, revolving credit accounts, investment accounts, brokerage accounts, pension accounts, etc.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates an example set of adjustment records associated with a financial account, in accordance with one or more aspects of the present disclosure;

FIG. 3 schematically illustrates an example account snapshot including transaction records reflecting previously processed transactions associated with the financial account identified by the adjustment records, in accordance with one or more aspects of the present disclosure;

FIG. 4 schematically illustrates rolling back previously processed transactions that have the effective dates matching or following the earliest effective date of the set of adjustment records, in accordance with one or more aspects of the present disclosure;

FIG. 5 schematically illustrates merging the adjustment records and the identified transaction records to produce a plurality of adjusted transaction records, in accordance with one or more aspects of the present disclosure;

FIG. 6 schematically illustrates combining the set of adjusted transactions with the previously saved account snapshot to produce the adjusted account data, in accordance with one or more aspects of the present disclosure;

FIG. 7 schematically illustrates an adjustment summary table including a plurality of records corresponding to the plurality of records of the previously saved account snapshot, in accordance with one or more aspects of the present disclosure;

DETAILED DESCRIPTION

Described herein are methods and systems of applying retroactive adjustments to financial accounts.

Retroactive adjustment herein shall reference a transaction having the effective date on or before the effective date of at least one previously processed transaction of the same type associated with the affected financial account. Examples of transactions include financial transactions (e.g., fund transfer transactions or security purchase transactions) and non-financial transactions affecting the financial data (e.g., updating various event dates).

A transaction description may include an identifier of the transaction type, identifiers of one or more financial accounts associated with the transaction, the transaction effective date, identifiers of one or more external entities associated with the transaction, identifiers of one or more currencies of the transaction, identifiers of one or more financial instruments associated with the transaction, amount of the transaction, non-financial data (e.g., one or more event dates), and/or a textual transaction description.

Retroactive adjustments may be applied to a financial account in order to update certain account data (such as various event dates or transaction amounts) and/or to process one or more transactions that for any reason may have not been processed on or after their respective effective dates. The present disclosure provides methods and systems of applying retroactive adjustments to financial accounts, as described in more detail herein below. Various aspects of the methods and systems are described herein by way of examples, rather than by way of limitation. The methods and systems described herein may be implemented by hardware (e.g., general purpose and/or specialized processing devices, and/or other devices and associated circuitry), software (e.g., instructions executable by a processing device), or a combination thereof.

Figure 1:
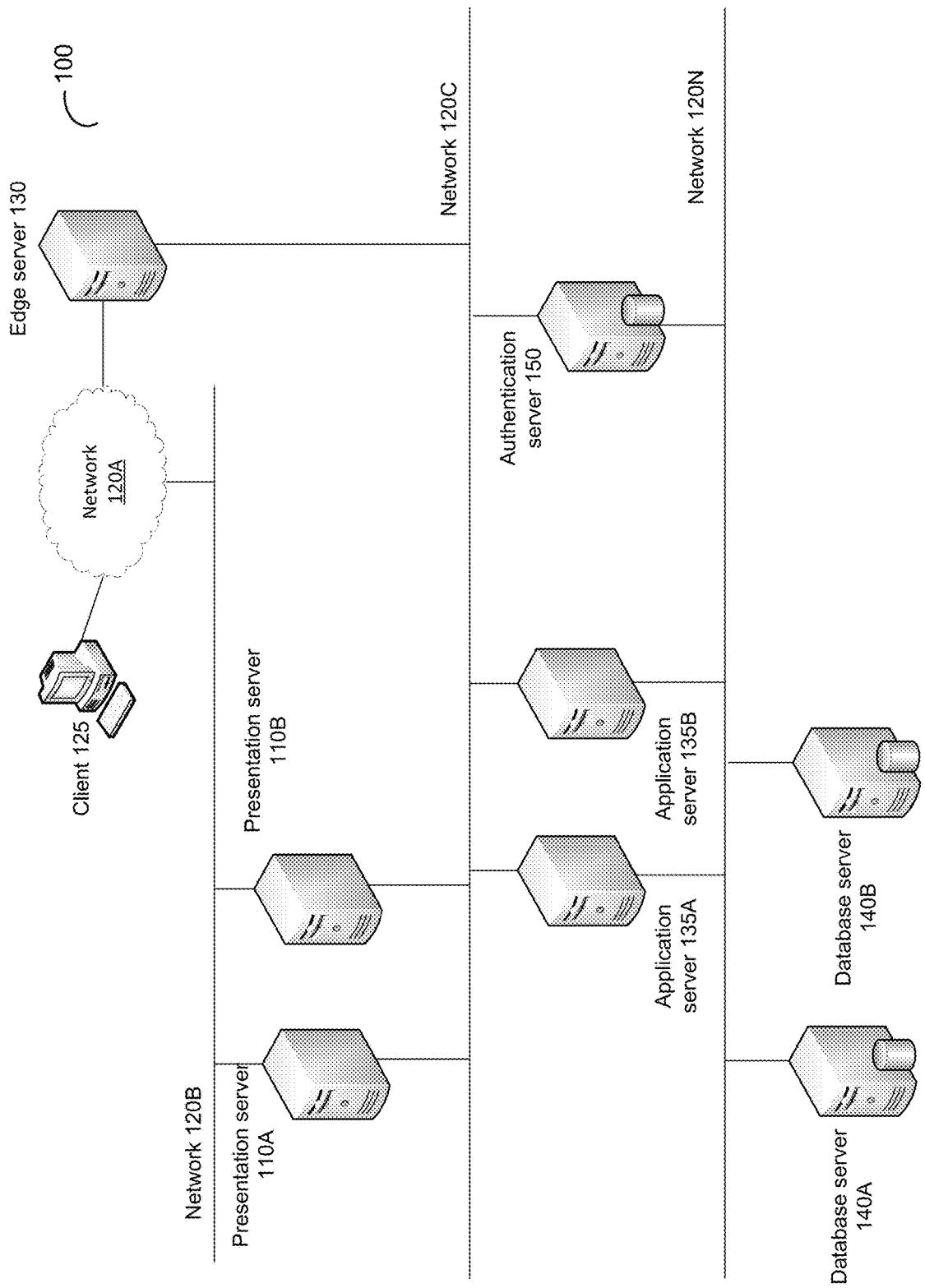
FIG. 1 schematically illustrates a high-level network diagram of an example distributed computer system 100 operating to implement the methods and systems of applying retroactive adjustments to financial accounts, in accordance with one or more aspects of the present disclosure.

FIG. 1 schematically illustrates a high-level network diagram of an example distributed computer system 100 implementing the methods and systems of applying retroactive adjustments to financial accounts, in accordance with one or more aspects of the present disclosure. Computer systems, appliances, and network segments are shown in FIG. 1 for illustrative purposes only and do not in any way limit the scope of the present disclosure. Routers, firewalls, load balancers, network switches and various other components may be omitted from FIG. 1 for clarity. Various other computer systems, components, appliances, and/or methods of their interconnection may be compatible with the methods and systems described herein.

The example distributed computer system 100 may comprise various components, including, e.g., one or more presentation servers 110A-110B, one or more application servers 135A-135B, one or more database servers 140A-140B, one or more authentication servers 150, and/or various other components. The above-described and other components of the example distributed computer system 100 may be interconnected by one or more networks 120A-120N, which may include one or more virtual or physical networks, such as local area networks and/or wide area networks.

In an illustrative example, an application server 135 may operate in a batch processing mode to receive (e.g., via a network interface or a file system) and process a plurality of adjustment records associated with one or more financial accounts. In an illustrative example, the adjustment records may be provided by one or more files encoded in one or more formats that are supported by the application server 135 (e.g., an XML format, a comma-delimited format, or a proprietary spreadsheet format).

In another illustrative example, a request to process a set of adjustment records may be submitted by a user via a graphical user interface of a client 125. In certain implementations, the request initiated by the client 125 may be routed, over one or more networks 120A-120N, to an edge server 130, which may then select, e.g., based on a load balancing scheme, a presentation server 110 to which the client request should be forwarded. In addition to performing the load balancing, edge servers 130 may serve static content in response to client HTTP requests, and/or perform various other tasks.

The presentation server 110 may, upon parsing the incoming request, issue one or more requests to one or more application servers 135A-135B configured to implement the methods described herein for applying retroactive adjustments to financial accounts.

An application server 135 may process the request received from a presentation server 110 and produce a response to be returned to the client 125. The request processing by application server 135 may comprise issuing one or more requests to one or more database servers 140A-140B. The presentation server 110 may then wrap the response produced by the application server 135 into one or more HTTP response messages and return the response messages to client 125 (e.g., via an edge server 130).

In an illustrative example, processing the adjustment records by the application server 135 may involve identifying the received set of transaction records as representing adjustment records, saving an account snapshot including transaction records reflecting previously processed transactions associated with the affected financial account, rolling back previously processed transactions that have respective effective dates matching or following the earliest date among effective dates of the adjustment records, merging the adjustment records and the previously processed transaction records to produce a plurality of adjusted transaction records, processing adjusted transaction records to produce the updated state of the account, and/or comparing the saved account snapshot to the updated state of the account in an attempt to produce adjustment events. If one or more adjustment events have been produced, they may be processed using one or more event processing rules, as described in more detail herein below. The updated state of the financial account and adjusted transaction records may be saved to one or more databases maintained by database servers 140A-140B.

FIG. 2 schematically illustrates an example set of adjustment records 200 associated with a financial account. As noted herein above, the adjustment records may be provided by one or more files encoded in one or more predefined formats (e.g., an XML format, a comma-delimited format, or a proprietary spreadsheet format). As schematically illustrated by FIG. 2, the example set of adjustment records 200 may include one or more transaction records, such that each transaction record includes the transaction effective date (field 220), and one or more transaction amount fields (e.g., Compensation Received field 230 and Employee Contribution field 240). The set of adjustment records may optionally include the Date Received field 210 indicating the date on which the set of adjustment records has been received for processing. Alternatively, the Date Received may be set by the processing server (e.g., the application server 135) to match the current date.

In the illustrative example of FIG. 2, all the adjustment records share the same transaction type. Alternatively, each adjustment record may include a transaction type field, which may be digitally encoded and/or represented by a human-readable textual string.

In the illustrative example of FIG. 2, all the adjustment records are related to the same account. Alternatively, each adjustment record may include identifiers of one or more financial accounts affected by the transaction.

In various other examples, an adjustment record may include identifiers of one or more external entities associated with the transaction (e.g., third-party accounts), identifiers of one or more currencies of the transaction, identifiers of one or more financial instruments associated with the transaction, non-financial data (e.g., one or more event dates, such as account holder date of birth, date of commencing or ceasing employment, etc.), and/or a textual transaction description.

In the illustrative example of FIG. 2, the adjustment records are represented by delta type records, which may be merged with the previously processed transactions by additively combining the specified transaction amounts for a previously processed transaction and an adjustment record, which have the same transaction type, as described in more detail with reference to an illustrative example of FIG. 5. Alternatively, the adjustment records may be represented by replacement type records, which may be merged with the previously processed transactions by replacing the transaction amount of the previously processed transaction. Regardless of whether the adjustment was represented by a delta record or a replacement record, the merging process would involve identifying, for the adjustment record, a corresponding previously processed transaction of the same transaction type which has the same or later effective date, rolling back the identified transaction, and processing the adjustment transaction, as described in more detail herein below.

As current transaction records (i.e., transaction records for which pre-existing transactions of the same type with an equal or later transaction date exist) and adjustment records received by the processing server may have the same or similar formats, the processing server should be able to determine whether a given transaction record represents a current transaction record or an adjustment record. In certain implementations, the processing server may determine that a given transaction record represents an adjustment record if the effective transaction date specified by the transaction record precedes the latest effective date of the previously processed transactions of the same type associated with the affected financial account.

Responsive to determining that one or more received transaction records represent adjustment records, the processing server may save an account snapshot. The account snapshot may include transaction records reflecting previously processed transactions associated with the affected financial account. In an illustrative example, the account snapshot may only include transaction records reflecting previously processed transactions having respective effective dates within a specified reporting period (e.g., the current year). FIG. 3 schematically illustrates an example account snapshot 300 including transaction records reflecting previously processed transactions associated with the financial account associated with the adjustment records. As schematically illustrated by FIG. 3, the account snapshot 300 may include one or more transaction records, such that each transaction record includes the Date Received field 310 indicating the date on which the transaction record has been received for processing, the transaction effective date (field 320), and one or more transaction amount fields (e.g., Compensation Received field 330, Compensation Limited field 340, Limited Employee Contribution field 350, and Match Calculated field 360).

Responsive to saving the account snapshot, the processing server may identify a set of transactions to be adjusted by applying the received set of adjustment records. As schematically illustrated by FIG. 3, the set of previously processed transactions 390 may include all previously processed transactions that have the effective dates matching or following the earliest effective date of the set of adjustment records.

Figure 4:
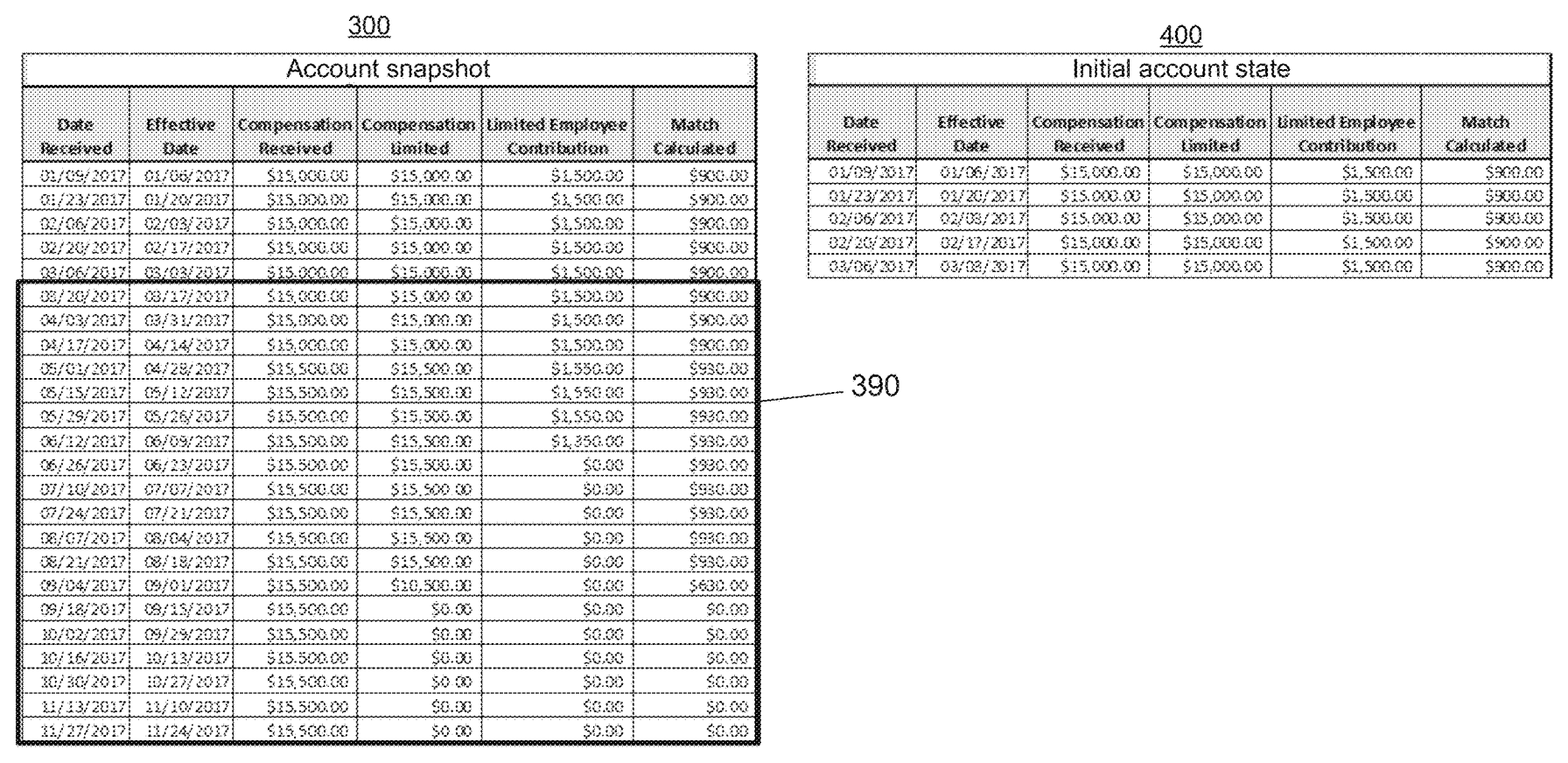

Upon saving the account snapshot, the processing server may roll back the identified previously processed transactions 390, returning the account to the initial account state 400, which reflects only previously processed transactions preceding the earliest effective date of the set of adjustment records, as schematically illustrated by FIG. 4.

Upon rolling back the identified previously processed transactions 390, the processing server may merge the received adjustment records and the identified set of transactions 390 to produce a plurality of adjusted transaction records, as schematically illustrated by FIG. 5. As noted herein above, the adjustment records of the illustrative example described herein with references to FIGS. 2-8 are represented by delta type records. The set of adjustment records 510 represented by delta type records may be merged with the previously processed transaction records 520 by iterating through the set of adjustment records 510 in the chronological order of their respective effective dates. For each adjustment record of the set of adjustment records 510, a corresponding previously processed transaction may be identified, such that the adjustment record and the identified previously processed transaction have the same transaction type and effective date. Responsive to identifying the corresponding previously processed transaction, an adjusted transaction record may be generated and appended to the set of adjusted transactions 530. While having the same transaction type and effective date as the identified previously processed transaction that is being adjusted, the newly generated adjusted transaction would have the transaction amount represented by a sum of the transaction amounts of the previously processed transaction and the corresponding adjustment record. In the illustrative example of FIG. 5, the adjustment record having the effective date of Mar. 17, 2017 is matched with a previously processed transaction having the same effective date, and an adjusted transaction is generated having the value of each transaction amount field represented by a sum of the corresponding fields of the two transactions being merged. For example, the adjusted Compensation Received value may be represented by a sum of the corresponding fields of the two transactions being merged ($64,900=$15,000+$49,900), and the adjusted Employee Contribution value may be represented by a sum of the corresponding fields of the two transactions being merged ($6,490=$1,500+$4,990).

The processing server may then process the adjusted transaction records by iterating through the adjusted transaction records in the chronological order of their respective effective dates and applying each adjusted transaction record to the current state of the account. For the first adjusted transaction to be processed, the current state of the account is represented by the saved account snapshot, while for each subsequent adjusted transaction to be processed, the current state of the account is represented by the result of processing the previous transaction.

In certain implementations, the adjustment records may be represented by replacement type records, merging of which with the previously processed transactions would involve identifying, for each replacement type adjustment record, a corresponding previously processed transaction record having the same effective date and transaction type. The identified previously processed transaction should be discarded, while the transaction described by the corresponding adjustment records should be processed instead.

In certain implementations, the computer system may suspend one or more normal transaction processing triggers for processing the adjustment records. Such transaction processing triggers may specify certain actions (e.g., automated notifications, database table updates, or execution of specified procedures) that would be caused by processing the current date transactions. However, execution of such actions may not be always desirable when the adjustment records are processed (e.g., certain retroactive notifications would only confuse the receiving party; certain actions of workflows cannot be executed retroactively, etc.).

Upon processing all adjustment records of the set of adjustment records, the set of adjusted transactions 530 may be combined with the previously saved account snapshot 300 to produce the adjusted account data 610, as schematically illustrated by FIG. 6. The adjusted account data 610 may then be compared to the previously saved account snapshot 300 in an attempt to produce adjustment events. The comparison may involve iterating through the account snapshot 300, and identifying, for each original transaction of the account snapshot 300, a corresponding adjusted transaction of the adjusted account data 610, such that the corresponding adjusted transaction has the same transaction type and the same effective date as the original transaction. Responsive to determining that a transaction amount of the adjusted transaction differs from the corresponding transaction amount of the previously processed transaction of the snapshot 300, the processing server may generate an adjustment event record including the effective date, the event type, and the adjusted transaction amount.

FIG. 7 schematically illustrates an adjustment summary table 710 including a plurality of records corresponding to the plurality of records of the previously saved account snapshot 300. The adjustment summary table 710 may be produced by comparing the records of the account snapshot 300 and corresponding adjusted transaction of the adjusted account data 510. Therefore, each record of the adjustment summary table 710 may include the effective transaction date 720, the adjustment amounts (e.g., Delta Limited Employee Contribution 730 and Delta Match Calculated 740), and the adjusted amounts (e.g., Employee Contribution 750 and Match 760).

For any record of the adjustment summary table 710 that includes a non-zero adjustment amount, a corresponding adjustment event record may be generated and appended to the event set 770. Each adjustment event record may include the effective date 780, the event type 790, the adjusted transaction amount 795, and, optionally, the previous transaction amount (not shown in the sample adjustment summary table 710). The event type may be determined based on the name of the field the value of which has been adjusted. The textual description of the event type may be produced by appending the word "Change" to the name of the field the value of which has been adjusted; e.g., Employee Contribution Change.

The processing server may process the adjustment events using one or more event processing rules. In certain implementations, an event processing rule may specify one or more actions to be performed responsive to evaluating a conditional statement.

The processing server may iterate through the event set 770, and identify one or more event processing rules matching the event type of each event record of the event set 770. Responsive to identifying a matching rule, the processing server may evaluate a conditional statement specified by the rule and perform the actions specified by the conditional statement. A conditional statement to be evaluated by the event processing rule may compare an event type and/or one or more event parameters (e.g., event dates, account types) to specified values. In an illustrative example, actions to be performed may include generating and transmitting notifications to the account holder and/or other parties. In another illustrative example, actions to be performed may include executing specified workflows.

As noted herein above, examples of transactions being processed may include non-financial transactions affecting the financial data (e.g., various event dates). For non-financial transactions, the event processing rules may specify the actions to be performed responsive to detecting an adjustment of non-financial data fields. In an illustrative example, adjustment of the date of birth of an account holder may result in an earlier eligibility for certain plan benefits associated with the account. In another illustrative example, adjustment of the date of hire of the account holder may result in adjusting the vesting date associated with certain vesting rights associated with the account.

Figure 8:
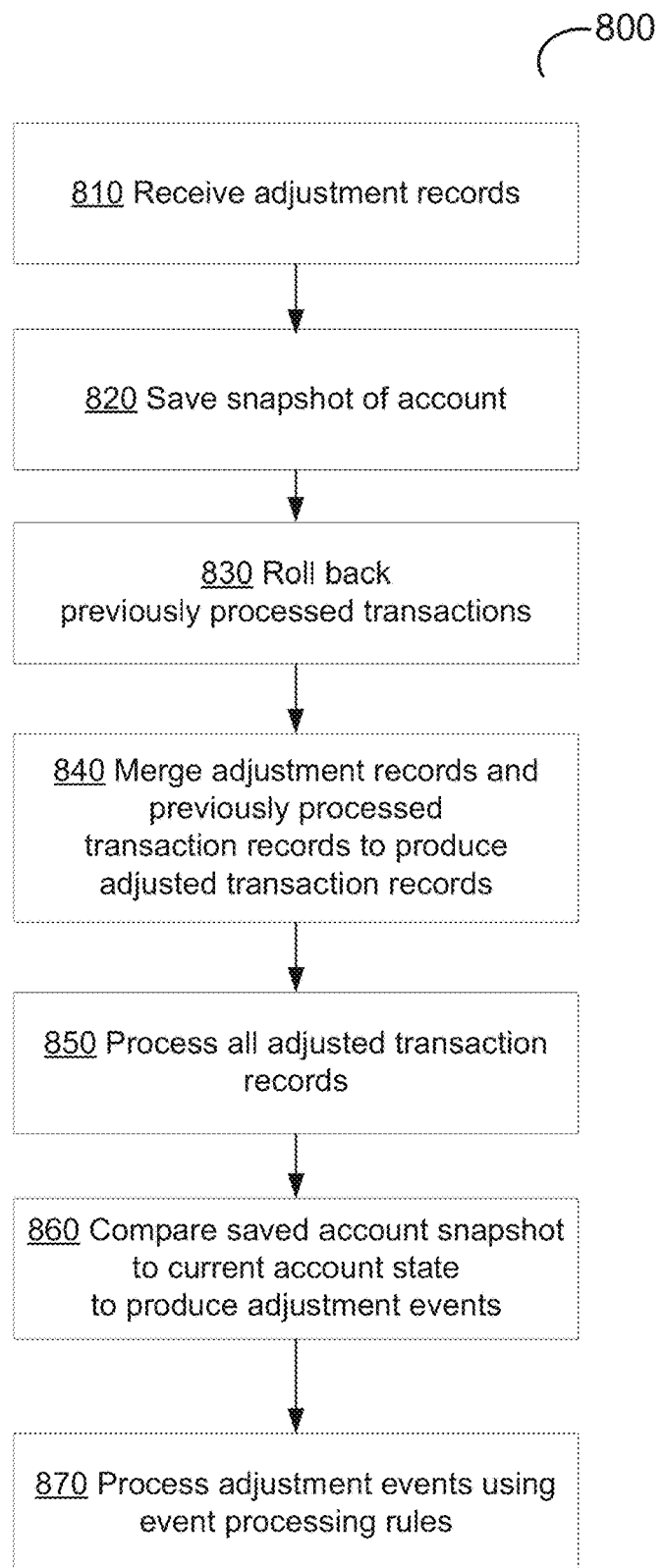
FIG. 8 depicts a flow diagram of an example method and system of applying retroactive adjustments to financial accounts, in accordance with one or more aspects of the present disclosure.

FIG. 8 depicts a flow diagram of an example method 800 for applying retroactive adjustments to financial accounts, in accordance with one or more aspects of the present disclosure. Method 800 and/or each of its individual functions, routines, subroutines, or operations may be performed by one or more general purpose and/or specialized processing devices. Two or more functions, routines, subroutines, or operations of method 800 may be performed in parallel or in an order that may differ from the order described above. In certain implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other. In an illustrative example, method 800 may be performed by one or more application servers 135 of FIG. 1.

Referring to FIG. 8, at block 810, the computer system implementing the method may receive one or more adjustment records associated with a financial account. In certain implementations, the computer system may determine that the received set of records represents adjustment records, by ascertaining that each of the received records has a respective effective date preceding a certain date (e.g., the current date or the latest effective date of the previously processed transactions associated with the financial account). In various illustrative examples, each adjustment record may include an identifier of a transaction type, an identifier of an external entity associated with the transaction, an identifier of a currency of the transaction, an identifier of a financial instrument associated with the transaction, an amount of the transaction, a date of an event associated with the financial account, non-financial data associated with the financial account, and/or a textual description of the transaction.

At block 820, the computer system may save a snapshot of the financial account. The snapshot may include a plurality of transaction records reflecting a plurality of previously processed transactions associated with the financial account. In certain implementations, the snapshot may reflect the previously processed transactions that have respective effective dates matching or following the earliest date among effective dates of the adjustment records.

At block 830, the computer system may roll back the previously processed transactions that have respective effective dates matching or following the earliest date among effective dates of the adjustment records.

At block 840, the computer system may merge the adjustment records and the previously processed transaction records to produce a plurality of adjusted transaction records. In certain implementations, merging the adjustment records and the transaction records comprises identifying a set of transactions to be adjusted by the set of adjustment records. In an illustrative example, the processing server may identify and merge an adjustment record and a transaction record having a common transaction type, such that the identified transaction record has the same or previous effective transaction date. In certain implementations, the computer system may suspend normal transaction processing triggers while the merging operations are performed, as described in more detail herein above.

At block 850, the computer system may process all adjusted transaction records to produce the updated state of the account. Processing the adjusted transaction records may involve iterating through the adjusted transaction records in the chronological order of their respective effective dates and applying each adjusted transaction record to the current state of the account, as described in more detail herein above.

At block 860, the computer system may compare the saved snapshot to the updated state of the account in an attempt to produce adjustment events, as described in more detail herein above.

At block 870, the computer system may process the produced adjustment events using one or more event processing rules, and the method may terminate.

Figure 9:
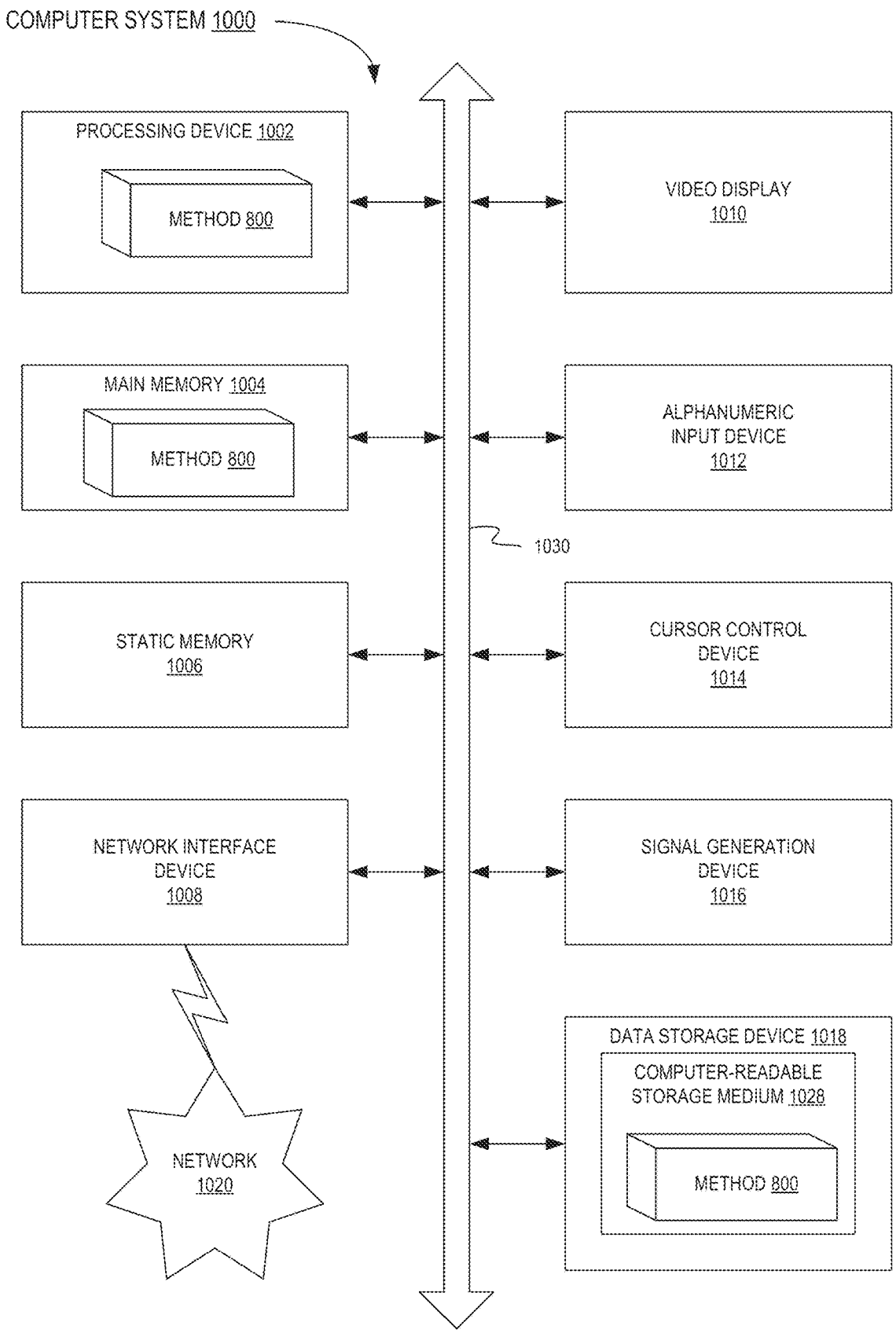
FIG. 9 depicts a block diagram of an illustrative computer system operating in accordance with one or more aspects of the present disclosure.

FIG. 9 illustrates a diagrammatic representation of a computer system 1000 within which a set of instructions for causing the computing device to perform the methods discussed herein may be executed. The computer system 1000 may be connected to other computing devices in a LAN, an intranet, an extranet, and/or the Internet. The computer system 1000 may operate in the capacity of a server machine in a client-server network environment. The computer system 1000 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term computer system shall also be taken to include any collection of computing devices that individually or jointly execute a set (or multiple sets) of instructions to perform the methods discussed herein. In illustrative examples, the computer system 1000 may be implementing the above-described method 800 for applying retroactive adjustments to financial accounts.

The computer system 1000 may include a processing device (e.g., a general purpose processor) 1002, a main memory 1004 (e.g., synchronous dynamic random access memory (DRAM), read-only memory (ROM)), and a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), a network processor, or the like. The processing device 1002 may be configured to execute the method 800 for applying retroactive adjustments to financial accounts, in accordance with one or more aspects of the present disclosure.

The computer system 1000 may further include a network interface device 1008, which may communicate with a network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the method 800 for applying retroactive adjustments to financial accounts, in accordance with one or more aspects of the present disclosure) implementing any one or more of the methods or functions described herein. Instructions implementing the method 800 may also reside, completely or at least partially, within main memory 1004 and/or within processing device 1002 during execution thereof by computer system 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term computer-readable storage medium shall be taken to include a single medium or multiple media (e.g., a centralized or distributed database and/or associated caches and servers) that store one or more sets of instructions. The term computer-readable storage medium shall also be taken to include any medium that is capable of storing, encoding or carrying a set of instructions for execution by the machine and that cause the machine to perform the methods described herein. The term computer-readable storage medium shall accordingly be taken to include, but not be limited to, solid-state memories, optical media and magnetic media.

Unless specifically stated otherwise, terms such as updating, identifying, determining, sending, assigning, or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms first, second, third, fourth, etc. as used herein are meant as labels to distinguish among different elements and may not necessarily have an ordinal meaning according to their numerical designation.

Examples described herein also relate to an apparatus for performing the methods and systems described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct a more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   receiving, by a computer system, one or more adjustment records associated with a financial account;
   saving a snapshot of the financial account, the snapshot comprising a plurality of transaction records reflecting previously processed transactions preceding an earliest date among effective dates of the adjustment records;
   returning, by rolling back one or more previously processed transactions, the financial account to an initial account state;
   merging the adjustment records and the transaction records to produce a plurality of adjusted transaction records, such that each adjusted transaction record has a transaction amount represented by a sum of a transaction amount of a previously processed transaction and a transaction amount of a corresponding adjustment record, wherein the corresponding adjustment record and the previously processed transaction share a transaction type and an effective date, wherein merging the adjustment records and the transaction records comprises suspending a trigger specifying an automated notification to be caused by processing a transaction;
   processing the adjusted transaction records to produce an updated state of the financial account;
   comparing the saved snapshot to the updated state of the financial account to produce one or more adjustment events; and
   processing the adjustment events using one or more event processing rules.

2. The method of claim 1, wherein receiving the adjustment records comprises determining that each adjustment record has a respective effective date before an effective date of at least one previously processed transaction of the same type as the adjustment record.

3. The method of claim 1, wherein each adjustment record includes at least one of: an identifier of a transaction type, an identifier of an external entity associated with a transaction, an identifier of a currency of the transaction, an identifier of a financial instrument associated with the transaction, an amount of the transaction, a date of an event associated with the financial account, non-financial data associated with the financial account, or a textual description of the transaction.

4. The method of claim 1, wherein each event processing rule specifies an action to be performed in response to evaluating a conditional statement.

5. A computer system, comprising:
a memory; and
a processor coupled to the memory, wherein the processor is configured to:
receive one or more adjustment records associated with a financial account;
save a snapshot of the financial account, the snapshot comprising a plurality of transaction records reflecting previously processed transactions preceding an earliest date among effective dates of the adjustment records;
return, by rolling back one or more previously processed transactions, the financial account to an initial account state;
merge the adjustment records and the transaction records to produce a plurality of adjusted transaction records, such that each adjusted transaction record has a transaction amount represented by a sum of a transaction amount of a previously processed transaction and a transaction amount of a corresponding adjustment record, wherein the corresponding adjustment record and the previously processed transaction share a transaction type and an effective date, wherein merging the adjustment records and the transaction records comprises suspending a trigger specifying an automated notification to be caused by processing a transaction;
process the adjusted transaction records to produce an updated state of the financial account;
compare the saved snapshot to the updated state of the financial account to produce one or more adjustment events; and
process the adjustment events using one or more event processing rules.

6. The computer system of claim 5, wherein receiving the adjustment records comprises determining that each adjustment record has a respective effective date before an effective date of at least one previously processed transaction of the same type as the adjustment record.

7. The computer system of claim 5, wherein each adjustment record includes at least one of: an identifier of a transaction type, an identifier of an external entity associated with a transaction, an identifier of a currency of the transaction, an identifier of a financial instrument associated with the transaction, an amount of the transaction, a date of an event associated with the financial account, non-financial data associated with the financial account, or a textual description of the transaction.

8. The computer system of claim 5, wherein each event processing rule specifies an action to be performed in response to evaluating a conditional statement.

9. A computer-readable non-transitory storage medium comprising executable instructions that, when executed by a computer system, cause the computer system to perform operations comprising:
receiving one or more adjustment records associated with a financial account;
saving a snapshot of the financial account, the snapshot comprising a plurality of transaction records reflecting previously processed transactions associated with the financial account;
returning, by rolling back one or more previously processed transactions, the financial account to an initial account state;
merging the adjustment records and the transaction records to produce a plurality of adjusted transaction records, such that each adjusted transaction record has a transaction amount represented by a sum of a transaction amount of a previously processed transaction and a transaction amount of a corresponding adjustment record, wherein the corresponding adjustment record and the previously processed transaction share a transaction type and an effective date, wherein merging the adjustment records and the transaction records comprises suspending a trigger specifying an automated notification to be caused by processing a transaction;
processing adjusted transaction records to produce an updated state of the financial account;
comparing the saved snapshot to the updated state of the financial account to produce one or more adjustment events; and
processing the adjustment events using one or more event processing rules.

10. The computer-readable non-transitory storage medium of claim 9, wherein receiving the adjustment records comprises determining that each adjustment record has a respective effective date before an effective date of at least one previously processed transaction of the same type as the adjustment record.

11. The computer-readable non-transitory storage medium of claim 9, wherein each adjustment record includes at least one of: an identifier of a transaction type, an identifier of an external entity associated with a transaction, an identifier of a currency of the transaction, an identifier of a financial instrument associated with the transaction, an amount of the transaction, a date of an event associated with the financial account, non-financial data associated with the financial account, or a textual description of the transaction.

12. The method of claim 1, wherein each event processing rule specifies an action to be performed in response to evaluating a conditional statement comparing one or more event parameters to specified values.

13. The method of claim 1, wherein each event processing rule specifies an action to be performed in response to evaluating a conditional statement, wherein the action is provided by at least one of: transmitting a notification to a holder of the financial account or performing a specified workflow.

14. The method of claim 1, wherein each event processing rule specifies an action to be performed in response to evaluating a conditional statement, wherein the action is provided by adjusting an eligibility date for a plan benefit associated with the financial account.

15. The method of claim 1, wherein merging the adjustment records and the transaction records further comprises suspending a second trigger specifying a database table update.

16. The computer system of claim 5, wherein each event processing rule specifies an action to be performed in response to evaluating a conditional statement, wherein the action is provided by at least one of: transmitting a notification to a holder of the financial account or performing a specified workflow.

17. The computer system of claim 5, wherein each event processing rule specifies an action to be performed in response to evaluating a conditional statement, wherein the action is provided by adjusting an eligibility date for a plan benefit associated with the financial account.

18. The computer-readable non-transitory storage medium of claim 9, wherein merging the adjustment records and the transaction records further comprises suspending a second trigger specifying a database table update.

* * * * *